Figure 1:
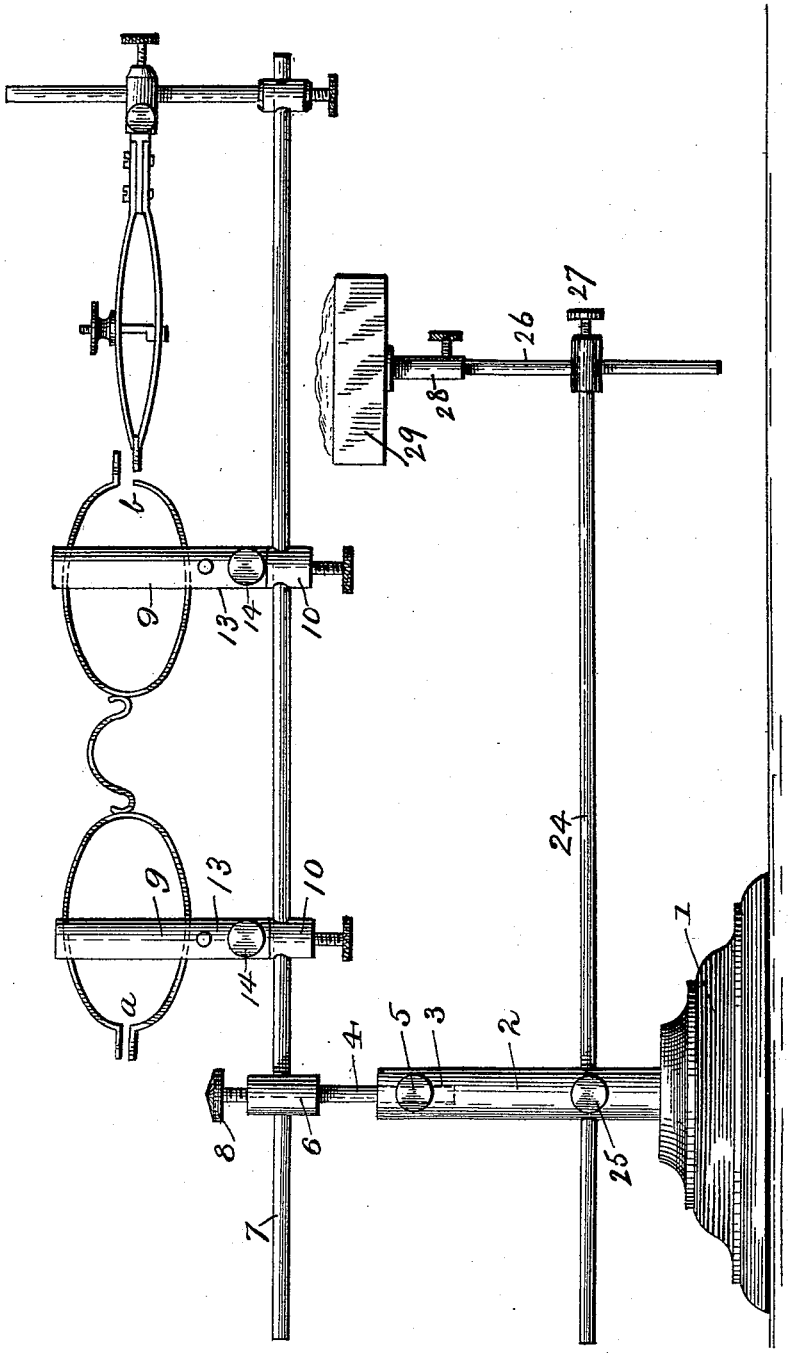

(No Model.) 2 Sheets—Sheet 1.

A. B. LEE.
ADJUSTABLE SOLDERING CLAMP.

No. 459,637. Patented Sept. 15, 1891.

WITNESSES:
F. L. Ourand
W. D. Coombs

INVENTOR:
Almon B. Lee,
by Davis & Jagger & Co.
Attorneys.

(No Model.) 2 Sheets—Sheet 2.
A. B. LEE.
ADJUSTABLE SOLDERING CLAMP.
No. 459,637. Patented Sept. 15, 1891.
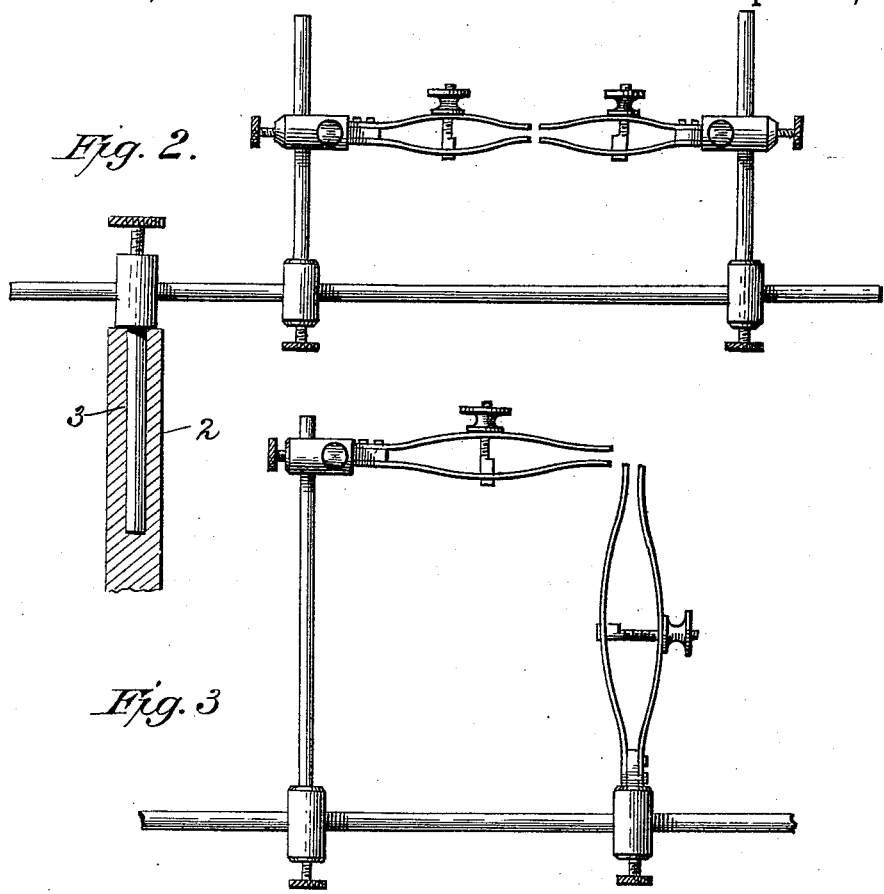
*Fig. 2.*
*Fig. 3*
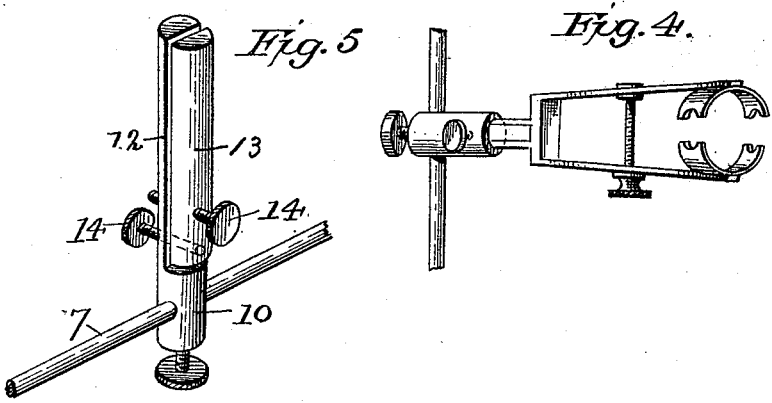
*Fig. 5*
*Fig. 4.*
WITNESSES:
F. L. Durand
J. L. Coombs
INVENTOR:
Almon B. Lee,
By Sauis Bagger & Co.
Attorneys

UNITED STATES PATENT OFFICE.

ALMON B. LEE, OF BANGOR, MICHIGAN.

ADJUSTABLE SOLDERING-CLAMP.

SPECIFICATION forming part of Letters Patent No. 459,637, dated September 15, 1891.

Application filed July 14, 1890. Serial No. 358,766. (No model.)

*To all whom it may concern:*

Be it known that I, ALMON B. LEE, a citizen of the United States, residing at Bangor, in the county of Van Buren and State of Michigan, have invented certain new and useful Improvements in Soldering Apparatus, of which the following is a full, clear, and exact specification.

My invention relates to soldering devices for the use of jewelers, silversmiths, and others, the object being to provide a simple, economical, and efficient apparatus by means of which spectacle and eyeglass frames, rings, and other similar articles may be securely held while being soldered.

The invention consists in the novel construction and combination of parts hereinafter fully described, and specifically pointed out in the claims.

In the accompanying drawings, Figure 1 is a side elevation, partly in section, of an apparatus constructed in accordance with my invention. Fig. 2 is a sectional view of a portion of the same, showing a modified arrangement of clamps. Figs. 3 and 4 are detail views showing further modifications. Fig. 5 is a detail view of one of the holders.

In the said drawings, the reference-numeral 1 designates a base or block of metal or other suitable material, formed or provided with an upright 2, having a vertical slot 3 at its upper end, within which fits a vertically-movable rod 4, which is held in position by means of a thumb-screw 5, passing through an aperture or hole in said upright and bearing against said rod. The upper end of this rod is formed with a head 6, having a horizontal aperture therethrough to receive a slidable bar 7, which is horizontally adjustable and retained in place by the thumb-screw 8. This bar carries one or more holders 9, each consisting of a head 10, with an upwardly-projecting arm 12 and a separate arm 13, connected with arm 12 by means of thumb-screws 14, whereby said arm 13 may be adjusted to and from arm 12 to grasp an article therebetween, in the present instance an eyeglass-frame being shown as held by said arm. The bar 7 passes through apertures in the heads 6, which are horizontally movable and also rotatable on said bar, being held in place by the thumb-screws 15.

Mounted upon bar 4 is one or more rods 16, having heads 17, through which said rod passes. These rods are horizontally movable and rotatable upon said bar, being held in place by thumb-screws 18, and they carry a rotatable and vertically-movable arm 19, having a thumb-screw 20 at one end. At the other ends these arms are provided with a horizontal socket to receive the spring clamping-jaws 21, provided with set-screw 22, and also with thumb-screws 23.

Passing through an aperture in the lower part of the upright 2 is a horizontally-movable bar 24, provided with thumb-screw 25. One end of this bar carries a vertically and horizontally movable rod 26, having thumb-screw 27. The upper end of this rod is pivotally connected with another rod 28, carrying at its upper end a pan 29 to receive charcoal or other combustible material, forming a heater.

The operation will be readily understood. When an article such as an eyeglass-frame is to be held, it is placed in the holders, as seen in Fig. 1, which grasp and hold the same. In this figure the bow is supposed to be broken at the point *a* and one of the lugs to have been detached or broken at the point *b*. In the latter instance the lug to be soldered is held between the spring clamping-jaws. The clamps and holders are now rotated upon the horizontal rod and so shifted as to bring the parts over the heater, by which the necessary heat can be imparted to effect the soldering.

In Figs. 2 and 3 I have shown the clamps somewhat differently arranged, but the principle is the same as in Fig. 1, the holders in this case being removed from the bar or shifted to one side to be out of the way.

In Fig. 4 the spring-clamps are shown as constructed to hold a ring or similar article.

Having thus described my invention, what I claim is—

1. The combination, with the base having an upright with a socket in its upper end, a rod fitting in said socket, capable of vertically reciprocating therein, a horizontally-movable bar passing through said rod, and vertically movable and rotatable clamps carried by said bar, of the horizontally-movable bar passing through the lower part of said upright, the vertically and horizontally movable rod carried by said bar, and the bar carrying the heater, pivotally connected with said last-mentioned rod or bar, substantially as described.

2. The combination, with the base provided with an upright having a socket in its upper end, the vertically-movable rod working in said upright, the horizontally-movable bar passing through said rod, the horizontally-movable and rotatable bar or arm mounted on said bar, the rotatable and vertically-movable arm mounted thereon, and the spring clamping-jaws connected therewith, of the horizontally-movable bar passing through the lower part of the upright and carrying a horizontally and vertically movable rod, and the rod carrying the heater, pivotally connected therewith, substantially as described.

ALMON B. LEE.

Witnesses:
JOHN S. CROSS,
ARTHUR C. RUNYAN.